(12) United States Patent
Lohmar

(10) Patent No.: US 11,319,077 B2
(45) Date of Patent: May 3, 2022

(54) SYSTEM FOR MIXING AND DISTRIBUTING AIR IN AN AIRCRAFT CABIN AND AIRCRAFT HAVING SUCH A SYSTEM

(71) Applicant: Airbus Operations GmbH, Hamburg (DE)

(72) Inventor: Jens Lohmar, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 532 days.

(21) Appl. No.: 15/996,707

(22) Filed: Jun. 4, 2018

(65) Prior Publication Data

US 2018/0354628 A1 Dec. 13, 2018

(30) Foreign Application Priority Data

Jun. 8, 2017 (DE) .......................... 102017112595.7

(51) Int. Cl.
*B64D 13/08* (2006.01)
*B64D 13/06* (2006.01)

(52) U.S. Cl.
CPC ............. *B64D 13/08* (2013.01); *B64D 13/06* (2013.01); *B64D 2013/0625* (2013.01); *B64D 2013/0688* (2013.01)

(58) Field of Classification Search
CPC .................... B64D 13/08; B64D 13/06; B64D 2013/0688; B64D 2013/0625; F24F 2003/0448; F24F 3/052; F16L 9/19; F16L 9/20
USPC .......................................................... 454/71
See application file for complete search history.

(56) References Cited

U.S. PATENT DOCUMENTS

| | | | | |
|---|---|---|---|---|
| 2,651,250 A | * | 9/1953 | Marquardt | B61D 27/009 454/108 |
| 4,120,347 A | * | 10/1978 | Molnar | F24F 3/0522 138/116 |
| 4,742,760 A | * | 5/1988 | Horstman | B64D 13/00 454/76 |

(Continued)

FOREIGN PATENT DOCUMENTS

| | | |
|---|---|---|
| DE | 102006017004 B3 | 10/2007 |
| DE | 102011121053 A1 | 6/2013 |
| JP | 2000018694 A * | 1/2000 |

OTHER PUBLICATIONS

German Search Report; priority document.

*Primary Examiner* — Steven B McAllister
*Assistant Examiner* — Charles R Brawner
(74) *Attorney, Agent, or Firm* — Greer, Burns & Crain, Ltd.

(57) ABSTRACT

A system for mixing and distributing air in an aircraft cabin, comprising: a first, internal air supply line, a second air supply line at least partially surrounding the internal air supply line, and a mixed air distribution system for mixing the air supplied from the air supply lines and for distributing the mixed air. The mixed air distribution system comprises a plurality of outlet lines for the outlet of mixed air into the aircraft cabin. The two air supply lines comprise outlets which, in each case, discharge into the mixed air distribution system. The two air supply lines are thermally coupled, and the main directions of extent of the air supply lines and of the mixed air distribution system are oriented substantially parallel or collinear to one another.

18 Claims, 6 Drawing Sheets

(56) References Cited

U.S. PATENT DOCUMENTS

| | | | | |
|---|---|---|---|---|
| 4,906,496 | A | * | 3/1990 | Hosono ............... F16L 9/18 428/36.9 |
| 5,545,084 | A | * | 8/1996 | Fischer ............... B64D 13/08 454/76 |
| 8,303,384 | B2 | | 11/2012 | Krakowski et al. |
| 2009/0298408 | A1 | * | 12/2009 | Reisbach ............. B64D 13/00 454/76 |
| 2012/0118408 | A1 | * | 5/2012 | Holmgren ............ F24F 13/24 137/560 |
| 2013/0130607 | A1 | * | 5/2013 | Stengel ............... B64D 13/00 454/76 |
| 2014/0284314 | A1 | | 9/2014 | Everth |

* cited by examiner

SYSTEM FOR MIXING AND DISTRIBUTING AIR IN AN AIRCRAFT CABIN AND AIRCRAFT HAVING SUCH A SYSTEM

CROSS-REFERENCES TO RELATED APPLICATIONS

This application claims the benefit of the German patent application No. 10 2017 112 595.7 filed on Jun. 8, 2017, the entire disclosures of which are incorporated herein by way of reference.

FIELD OF THE INVENTION

The invention relates to a system for mixing and distributing air in an aircraft cabin and an aircraft having such a system. Systems for mixing and distributing air in an aircraft cabin are used as components of aircraft air-conditioning systems which serve for adjusting and maintaining the desired ambient conditions in the aircraft cabin, for example the cabin pressure, the cabin temperature and the cabin humidity.

BACKGROUND OF THE INVENTION

The cabin of a passenger aircraft is generally air-conditioned by means of an air-conditioning unit which is individual to the aircraft, both during the flight and when the aircraft is operating on the ground. The aircraft air-conditioning unit is supplied, for example, with bleed air which is removed from the engine compressors or auxiliary engine compressors and which is cooled in the air-conditioning systems, the so called air-conditioning packs of the aircraft air-conditioning unit, to a desired low temperature. The air cooled in the air-conditioning packs of the aircraft air-conditioning unit is conducted into a mixer where it is mixed with recirculated air suctioned from the aircraft cabin. The mixed air which is produced in the mixer and which consists of fresh air which has been already cooled from the air-conditioning packs and recirculated air which has been suctioned from the aircraft cabin is finally introduced into the aircraft cabin for air-conditioning the aircraft cabin.

In conventional aircraft air-conditioning systems the mixed air produced is introduced into the aircraft cabin via an air distribution system. Since the central mixers are typically arranged in the lower deck region, in particular, in the region of the so-called "belly fairing" of the aircraft (approximately in the front region of the aircraft wing box), the mixed air reaches the passenger regions in the upper deck of the aircraft initially via longitudinally extending air distribution pipes and then via so-called "riser ducts." The riser ducts extend in the region of an aircraft structure from the air outlet lines of the aircraft air-conditioning unit and/or the mixer arranged below the passenger cabin to air outlet openings provided in the interior components of the aircraft and discharging into the cabin region of the aircraft. Typically, the air outlet openings are located above the seating positions of the aircraft passengers and are thus configured, for example, on the ceiling cladding panels of the aircraft cabin.

SUMMARY OF THE INVENTION

It is an object of the present invention to provide an alternative system for mixing and distributing air in an aircraft cabin.

This object of the invention is achieved by a system for mixing and distributing air in an aircraft cabin comprising: a first internal air supply line, a second air supply line at least partially surrounding the internal air supply line, and a mixed air distribution system for mixing the air supplied from the air supply lines and for distributing the mixed air, wherein the mixed air distribution system comprises a plurality of outlet lines for the outlet of mixed air into the aircraft cabin, wherein the two air supply lines comprise outlets which in each case discharge into the mixed air distribution system, wherein the two air supply lines are thermally coupled and wherein the main directions of extent of the air supply lines and of the mixed air distribution system are oriented substantially parallel or collinear to one another.

Typically, the air cooled in the air-conditioning packs of the aircraft air-conditioning unit is conducted in the first internal air supply line. This air is frequently also denoted as so-called "pack air." Recirculated air suctioned from the aircraft cabin is typically conducted in the second air supply line. This air is frequently denoted as so-called "recirculated air." Generally, the pack air is cooler than the recirculated air and the mixed air combined therefrom has a temperature which is located between the temperature of the pack air and the temperature of the recirculated air.

According to the invention, the main directions of extent of the air supply lines and of the mixed air distribution system extend substantially parallel or collinear to one another, i.e., the main flow direction of the system for mixing and distributing air also extends in this main direction of extent. The main direction of extent of the system generally corresponds to the longitudinal direction of the air supply lines and/or the longitudinal direction of the mixed air distribution system and thus typically is identical to the longitudinal direction of the aircraft cabin. The outlets according to the invention on the two air supply lines are, however, typically oriented radially and/or transversely to the main direction of extent of the system. Similarly, the outlet lines generally extend at least partially radially and/or transversely to the main direction of extent.

The magnitude of the longitudinal extent of the system may, in principle, vary according to the size of the longitudinal extent of the cabin. One possibility is that the longitudinal extents of the system and the aircraft cabin substantially correspond to one another. A further example of the magnitude of the longitudinal extent of the system may be the distance of approximately 14 to 28 so-called "frame-bays." This corresponds approximately to 7-14 meters. In the longitudinal direction, the first and second air supply lines, in principle, may have a uniform flow cross section (i.e., the flow cross section in a front region of the system is substantially identical to a flow cross section in a rear region of the system). Then the air supply lines have substantially a cylindrical shape, not only individually but also combined together. Alternatively, however, the size of the flow cross section of the two supply lines may also vary in the longitudinal direction. (In other words, the flow cross section in a front region of the system is, for example, smaller than a flow cross section in a rear region of the system). Then the air supply lines may have a substantially conical shape, not only individually but also combined together.

According to the invention, the second air supply line at least partially surrounds the first internal air supply line, wherein the two air supply lines are thermally coupled. "Thermal coupling" is understood according to the invention that the air supply lines are not mutually insulated from one another but that a thermal transfer and/or a thermal exchange is possible between the media and/or air flowing in the two air supply lines. In other words, between the air flowing in the first air supply line (for example, pack air) and the air flowing in the second air supply line (for example, recirculated air) a thermal exchange (mutual cooling or heating) is able to take place. If the peripheral extent of the second air supply line extends around the first air supply line over the entire periphery, the thermal coupling and thus the mutual thermal exchange is at the greatest. The mixed air distribution system is arranged radially outwardly relative to the main directions of extent of the two air supply lines. The system according to the invention for mixing and distributing air in an aircraft cabin is generally arranged in the so-called "ceiling," i.e., in an upper region viewed in the cross section of the aircraft tail (in particular, between the aircraft cabin ceiling and the upper outer aircraft tail structure).

By the system according to the invention for mixing and distributing air, a system is advantageously provided by which a relatively uniform mixing and distribution of air is possible along the main directions of extent of the air supply lines, i.e., generally in the longitudinal direction of the aircraft cabin. As a result, mixing may be carried out at relatively low flow speeds. Low flow speeds are advantageous, among other things, with regard to a high mixing quality and with regard to low flow noise. A further substantial advantage of the system according to the invention is that air flowing in the second air supply line is cooled at a higher temperature, directly due to the thermal coupling between the two air supply lines, by the air at a lower temperature flowing in the first air supply line. This increases the energy efficiency of the system according to the invention. In principle, a reverse air guidance (relative to the temperature level) is also possible relative thereto. Preferably, however, the warmer recirculated air is conducted in the second air supply line and the cooler pack air is conducted in the first air supply line. By the at least partial or complete surrounding of the second air supply line around the first internal air supply line it is advantageous that firstly, no insulation is required of the first line and secondly, at least partially, no insulation is required of the second line.

The system architecture according to the invention is, among other things, also efficient with regard to the production of the system, in particular, since the total number of required components (for example the aforementioned insulation) is reduced. Also due to the relatively large dimensions, it is possible to pre-install components in an improved manner. With regard to the efficiency, the system according to the invention has relatively few surfaces for the air to flow over and shorter distances for the air to flow over so that, viewed as a whole, fewer pressure losses are present. Additionally, the system according to the invention permits a flexible cabin configuration.

In a preferred embodiment, for the thermal coupling of the two air supply lines, at least one line wall portion of the first air supply line forms a line wall portion of the second air supply line. In this manner, the thermal coupling between the first and second air supply line is particularly efficient. The temperature of the pack air typically conducted in the first air supply line may be continually increased, therefore, already during its passage through the first air supply line due to the thermal coupling with the second air supply line, as a result of the direct contact. Conversely, the temperature of the recirculated air which is typically conducted in the second air supply line may be continually reduced, already during its passage through the second air supply line due to the thermal coupling with the first air supply line, as a result of the direct contact. This effect is advantageous, in particular, for front aircraft cabin regions and/or for front temperature zones in which the seating density within the space and thus the thermal load may be lower.

A further preferred embodiment of the invention is characterized in that the mixed air distribution system at least partially surrounds the two air supply lines, in particular, that the mixed air distribution system comprises a mixing region fully surrounding the air supply lines. If the mixed air distribution system surrounds the two air supply lines, the constructional space available is advantageously efficiently utilized. The system is configured to be particularly spatially efficient if the mixed air distribution system comprises a mixing region which fully surrounds the air supply lines. The mixing region is then typically arranged outwardly in the radial direction relative to the two air supply lines.

In a further preferred embodiment, the outlets of the second air supply line discharging into the mixed air distribution system are formed by a plurality of perforations in a line wall of the second air supply line, wherein the line wall adjoins the mixed air distribution system, in particular, the mixing region of the mixed air distribution system. In this manner, a particularly uniform mixing of the air supplied in the second air supply line with the air supplied by the first air supply line is primarily achieved. The line wall with the plurality of perforations is advantageously able to dispense the air in a uniform manner over the entire relevant line wall surface into the mixed air distribution system and/or into the mixing region. To this end, there is the possibility that the line wall with the plurality of perforations may serve as a filter for the air supplied through the second air supply line. To this end, the perforation density and the perforation size on the line wall may be correspondingly selected.

In a preferred development of the present embodiment, the perforation density in a first longitudinal portion of the line wall differs from the perforation density in a second longitudinal portion of the line wall. In this manner, different mixing grades may be implemented in some regions. For example, therefore, a first mixing grade may be implemented in a first region and a second mixing grade may be implemented in a second region. In this case, the first region, for example, may be the front seating region of business class seating and the second region may be a rear region with economy class seating.

Particularly preferably, the outlet lines are arranged at regular intervals in the main direction of extent of the mixed air distribution system. In this manner, a uniformly distributed air outlet is permitted within the space. Moreover, the lengths of the outlet lines required for the air outlet are minimized with regard to the aircraft cabin region to be covered, i.e., air outlet line lengths which are as short as possible may be implemented and excessive air outlet line lengths may be prevented.

Also particularly preferably, the main outflow directions of the outlets and/or the outlet lines are oriented radially relative to a central longitudinal axis of the first supply line. In this manner, a spatially compact system may be advantageously provided for mixing and distributing air. If both the main outflow directions of the outlets and the main outflow directions of the outlet lines are oriented radially, advantageously no substantial reversal of the flow direction is required from the mixing to the distribution.

In a further preferred embodiment, for regulating a mixing ratio the flow cross sections of the outlets of the first air supply line and/or the flow cross sections of the second air supply line are changeable. Thus advantageously a possibility is provided of already varying at the outlets the mixing ratio of the (pack) air conducted in the first air supply line and the (recirculated) air conducted in the second air supply line. To this end, for example, mechanical devices may be used for altering the flow cross sections of the outlets. Using this embodiment of the system, a possibility is provided for adapting the mixing ratio individually and locally.

Preferably, at least one of the outlet lines is assigned a heating device, the mixed air being heatable thereby before its introduction into the aircraft cabin. In this manner, advantageously a possibility is provided of heating locally or even partially (for example in a temperature zone region) the air blown into the aircraft cabin via the outlet line. Thus, it is possible to influence individually or partially the temperature in the seating region of the passengers, so that the individual or even collective sensation of comfort of the aircraft passengers may be improved. In particular, electric heating devices may be used as such a heating device.

Further preferably, at least one of the air supply lines is assigned a heating device, the air supplied therein being heatable thereby before its introduction into the mixed air distribution system. Preferably, the heating device is assigned to the first internal air supply line. Thus advantageously a partial heating of the air supplied in the air supply line(s) is possible before it is blown via the outlet lines into the aircraft cabin. In this manner, it is possible to influence partially the temperature, in order to control the temperature of larger regions of the aircraft cabin in a targeted manner. In particular, electrical heating devices may be used as such a heating device.

In a particularly preferred embodiment, the line walls of the first air supply line and/or the second air supply line and/or the mixed air distribution system are formed at least partially from a flexible material, in particular from a flexible woven fabric material. In this manner, the air supply lines and/or the mixed air distribution system may be advantageously adapted to the space available and/or the volume available. Also, deformations of the tail structure due to load may be better absorbed and/or compensated by a flexible material, in particular a flexible woven fabric material. The flexible material and/or the flexible woven fabric material may have an insulating layer or may be provided with such an insulating layer.

A preferred development of the above embodiment is characterized in that a support structure is provided, the support structure positioning the flexible line walls of the first air supply line and/or the flexible line walls of the second air supply line and/or the flexible line walls of the mixed air distribution system relative to one another. In this manner, it is ensured that the system constructed from the flexible line walls is held together. The support structure in this case acts in a stabilizing manner. A stable cross-sectional shape of the system and/or the air supply lines and the mixed air distribution system is also assisted by the air pressure associated with the supply of air. Preferably, the outlets of the air supply lines are configured as rings at which the flexible material of the line walls terminates and/or into which it leads.

Also preferred is an embodiment in which the first air supply line is connected at one end with flow guidance to an aircraft air-conditioning unit and in which the second air supply line is connected at one end with flow guidance to a recirculated air unit. Thus the air cooled in the air-conditioning packs of the aircraft air-conditioning unit may be guided in the first internal air supply line and recirculated air suctioned from the aircraft cabin may be guided in the second air supply line. Generally, the pack air is cooler than the recirculated air and the mixed air combined therefrom has a mean temperature located therebetween.

Finally, an aircraft having a system according to the invention is preferred, wherein the system is arranged in the ceiling region of the aircraft tail cross section. Such an aircraft benefits from the above-described advantages of the system according to the invention. Such an aircraft according to the invention has a compact, lightweight and particularly efficient aircraft air-conditioning system.

The above-described characteristics and further characteristics, features and advantages of the invention may also be derived from the examples of the embodiments which are described hereinafter with reference to the accompanying drawings.

BRIEF DESCRIPTION OF THE DRAWINGS

In the figures, the same reference numerals are used for the same or at least similar elements, components or characteristics. It should be mentioned that hereinafter an embodiment is described in detail which is merely illustrative and non-limiting. In the claims, the word "comprising" does not exclude other elements and the indefinite article "a" does not exclude a plurality of elements. Merely that specific features are cited in different dependent claims does not limit the subject of the invention. Also combinations of these features may be advantageously used. The reference numerals in the claims are not intended to limit the scope of the claims. The figures are not to be understood as definitive but to have only a schematic and illustrative character. In the drawings:

DETAILED DESCRIPTION OF THE PREFERRED EMBODIMENTS

Figure 1A:
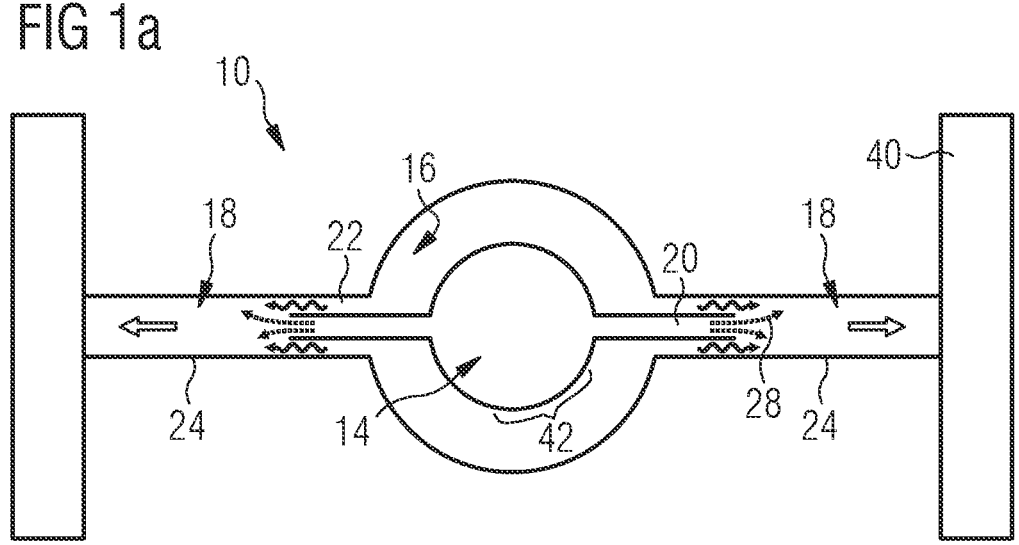
FIG. 1a shows a cross section of a system according to the invention for mixing and distributing air in an aircraft cabin according to a first embodiment.
Figure 1B:
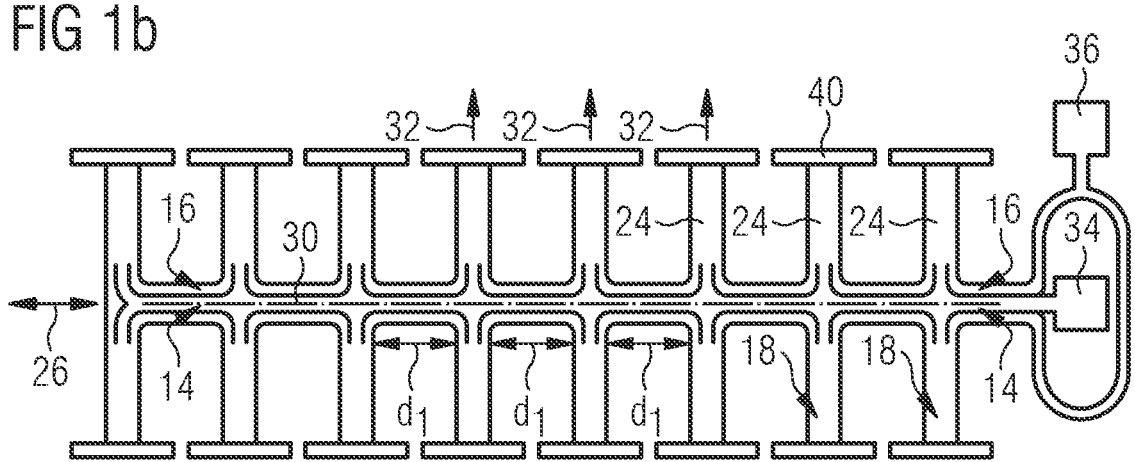
FIG. 1b shows a longitudinal section through the system according to FIG. 1a, FIG. 1c shows a further longitudinal section through the system according to FIG. 1 which extends through a region of the aircraft cabin.
Figure 1C:
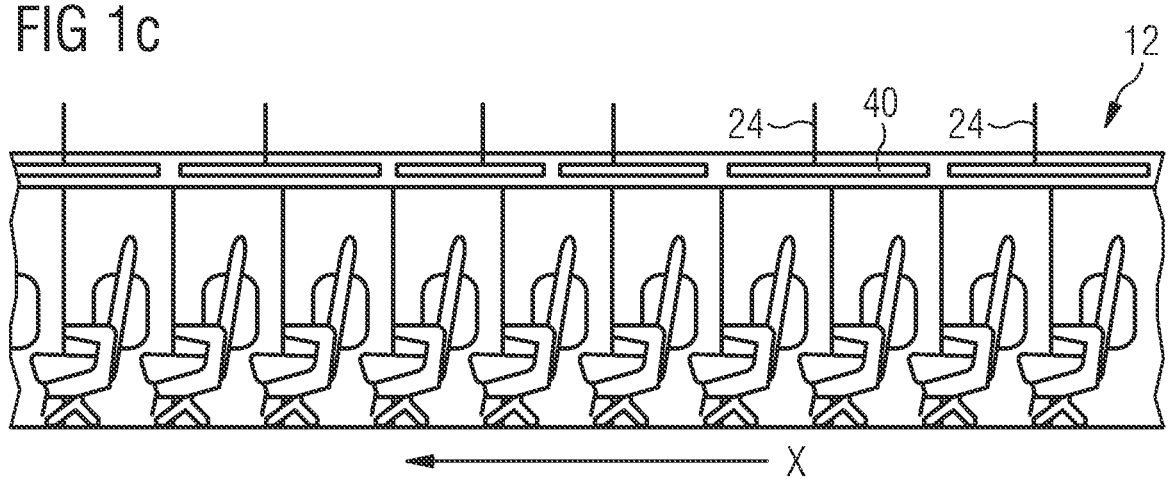

FIGS. 1a to 1c show a system 10 for mixing and distributing air in an aircraft cabin 12 with a first internal air supply line 14 and a second air supply line 16 at least partially surrounding the internal air supply line 14. The system 10 further comprises a mixed air distribution system 18 for mixing the air supplied from the air supply lines 14, 16 and for distributing the mixed air. The two air supply lines 14, 16 have outlets 20, 22 which in each case discharge into the mixed air distribution system 18. The air respectively conducted in the two air supply lines 14, 16 via the outlets 20, 22 from the respective air supply line 14, 16 may enter the mixed air distribution system 18 where the mixing takes place. The mixed air distribution system 18 in turn has a plurality of outlet lines 24 for the outlet of mixed air into the aircraft cabin 12. The main directions of extent 26 of the air supply lines 14, 16 and of the mixed air distribution system 18 are oriented parallel and/or collinear to one another and to the longitudinal direction of the aircraft cabin X. The main outflow directions 28 of the air passing from the outlets 20, 22 into the mixed air distribution system 18 is oriented substantially radially relative to a central longitudinal axis 30 of the first air supply line 14. Furthermore, the main outflow directions 32 of the air passing from the outlet lines 24 into the aircraft cabin 12 is oriented substantially radially relative to the central longitudinal axis 30 of the air supply lines 14, 16 (or has a radial component).

For controlling a mixing ratio of the air passing from the air supply lines 14, 16 the flow cross sections of the outlets 20, 22 of the first and/or the second air supply lines 14, 16 are changeable. To this end, for example, mechanical devices which are not shown in more detail and which, for example, are actuatable mechanically or electromechanically, may be provided.

As visible in FIG. 1b, the outlet lines 24 are arranged at regular intervals from one another dl in the main direction of extent 26 of the mixed air distribution system 18. The first air supply line 14 is connected at one end with flow guidance to an aircraft air-conditioning unit 34 and the second air supply line 16 is connected at one end with flow guidance to a recirculated air unit 36. In the installed situation in an aircraft 38, the aircraft air-conditioning unit 34 and the recirculated air unit 36 may be arranged in a rear aircraft region.

Air is suctioned from the aircraft cabin 12 by the recirculated air unit 36. The air provided by the recirculated air unit 36 is denoted as recirculated air. The aircraft air-conditioning unit 34, however, provides so-called pack air at a desired low temperature. The temperature of the recirculated air provided is typically above the temperature of the pack air provided (see FIG. 2).

The outlet lines 24 of the system 10 finally discharge via outlet line openings 40 into an upper region of the aircraft cabin 12 (FIG. 3).

Pack air provided by the aircraft air-conditioning unit 34 is conducted through the first air supply line 14 into the mixed air distribution system 18, where it is mixed with recirculated air provided by the recirculated air unit 36 and conducted via the second air supply line 16 into the mixed air distribution system 18. The mixed air is then introduced via the outlet lines 24 into the aircraft cabin 12. The fresh air portion is ensured by the supply of external fresh air into the aircraft air-conditioning unit 34.

Figure 2:
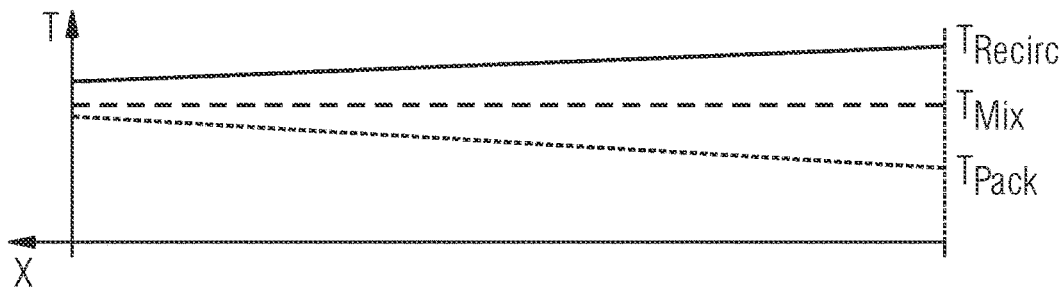
FIG. 2 shows a temperature curve in a longitudinal direction of embodiments of the system according to the invention.

FIG. 2 shows a possible temperature curve of the pack air T Pack, the recirculated air T Recirc and the mixed air T Mix. Since the two air supply lines 14, 16 are thermally coupled together, a mutual heat exchange takes place during the throughflow of the two air supply lines 14, 16. At the same time and/or during the mixing process in the mixed air distribution system 18, a mixing temperature T Mix is present. For the thermal coupling of the two air supply lines 14, 16, at least one line wall portion 42 of the first air supply line 14 forms a line wall portion of the second air supply line 16. Thus, with the increased throughflow of the first air supply line 14 in the X direction (main direction of extent 26), the pack air temperature increases and with the increased throughflow in the X direction the recirculated air temperature reduces according to the heat exchange. In the temperature curve shown in FIG. 2, the left-hand diagram region represents a front aircraft region and correspondingly the right-hand diagram region represents the rear aircraft region. The aircraft air-conditioning unit 34 and the recirculated air unit 36 in this case are arranged in the rear aircraft region. Although the temperature curves in FIG. 2 are shown in a linear manner, however, it goes without saying that an actual temperature curve may differ therefrom. For example, an asymptotic approximation of the temperature curves in the X direction may be adjusted to the common mean temperature T Mix.

Figure 3A:
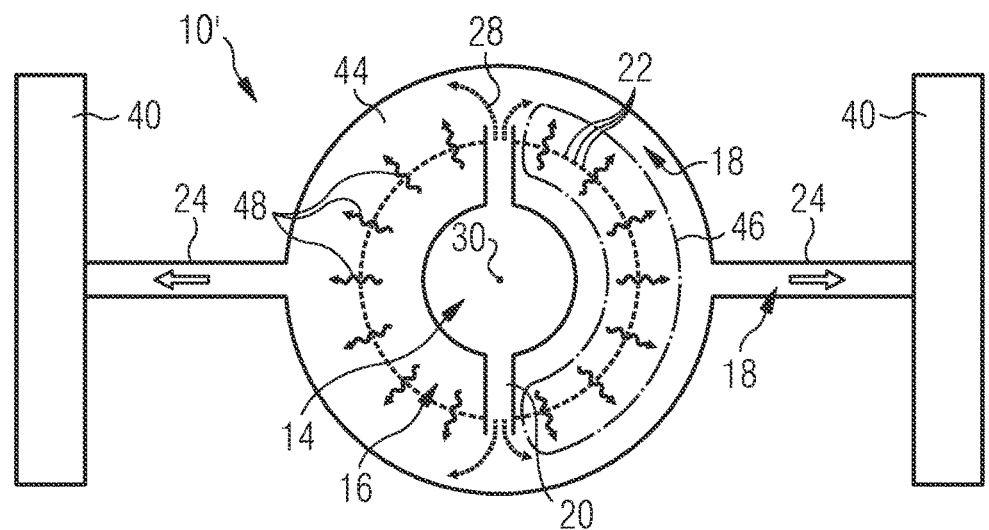
FIG. 3a shows a cross section of a system according to the invention for mixing and distributing air in an aircraft cabin according to a second embodiment.
Figure 3B:
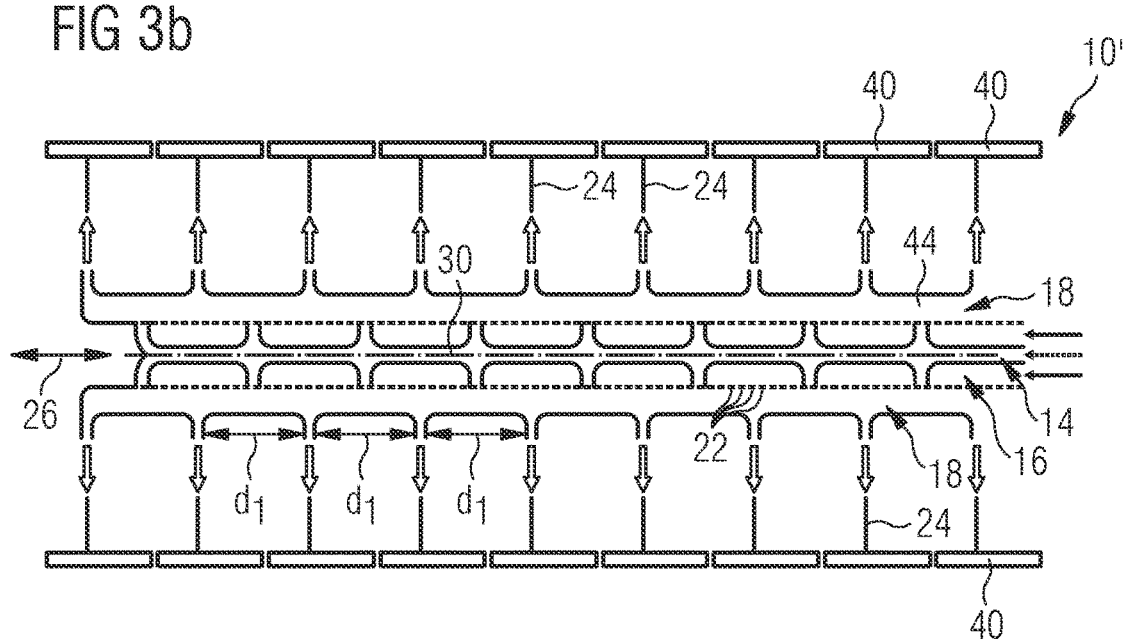
FIG. 3b shows a longitudinal section through the system according to FIG. 3a, FIG. 4 shows a cross section through a system according to the invention for mixing and distributing air according to a third embodiment.

FIGS. 3a and 3b show a further system 10' for mixing and distributing air in an aircraft cabin 12. The system 10' substantially comprises all of the features disclosed with reference to FIGS. 1a to 1c. In contrast to the embodiment disclosed in FIGS. 1a to 1c, the mixed air distribution system 18 of this system 10' at least partially surrounds the two air supply lines 14, 16. The mixed air distribution system 18 encompasses, in particular, a mixing region 44 fully surrounding the air supply lines 14, 16. The mixed air distribution system 18 comprises, in particular, a mixing region 44 fully surrounding the air supply lines 14, 16. The outlet lines 24 connect the mixing region 44 to the outlet line openings 40.

The outlets 20, 22 of the second air supply line 16 discharging into the mixed air distribution system 18 are formed by a plurality of perforations in a line wall 46 of the second air supply line 16. The line wall 46 adjoins the mixed air distribution system 18 and/or the mixing region 44. The main outflow directions 28 of pack air passing from the outlets 20 of the first air supply line 14 into the mixing region 44 is substantially radially oriented relative to the central longitudinal axis 30 of the first air supply line 14. Furthermore, the main outflow directions 48 of recirculated air passing from the perforations 22 into the mixing region 44 is radially oriented relative to the central longitudinal axis 30. The outlet lines 24 are also arranged at regular intervals dl from one another in the main direction of extent 26 of the mixing air distribution system 16.

Figure 4:
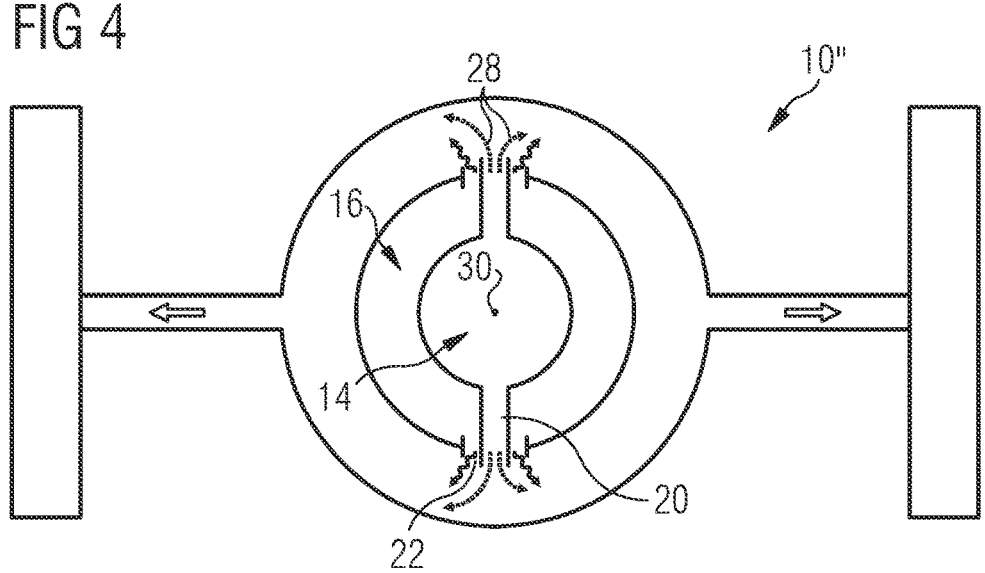

In FIG. 4 a further system 10" for mixing and distributing air in an aircraft cabin 12 is shown. In contrast to the above-described embodiments, in this case the outlets 20, 22 are arranged in an upper and lower region of the two air supply lines 14, 16. The main outflow directions 28 of the outlets 20 of the first air supply line 14 are oriented radially to the central longitudinal axis 30. For controlling the mixing ratio of the air passing from the air supply lines 14, 16, the flow cross sections of the outlets 20, 22 of the first and/or second air supply lines 14, 16 are changeable.

Figure 5:
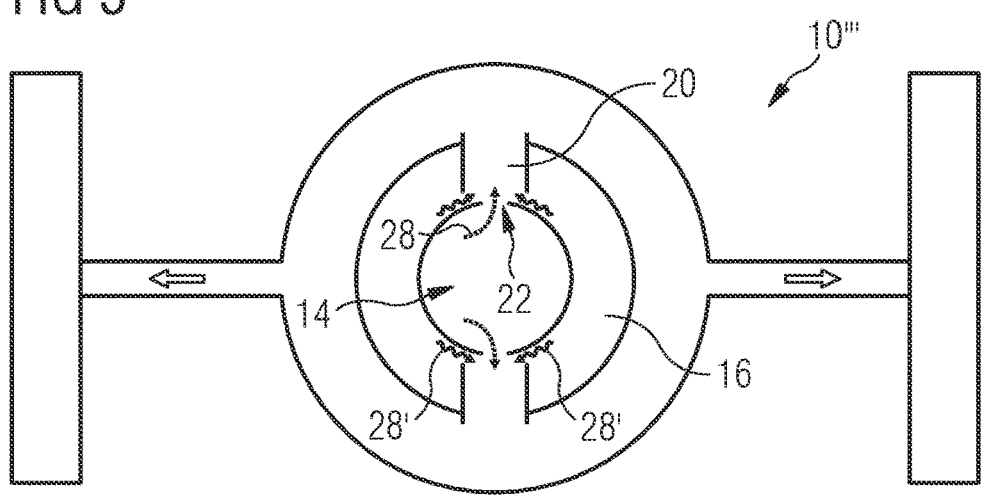
FIG. 5 shows a cross section through a system according to the invention for mixing and distributing air according to a fourth embodiment.

FIG. 5 shows a further system 10''' for mixing and distributing air in an aircraft cabin 12 in which, in contrast to the above-described embodiments, the main outflow directions 28' of the outlets 22 of the second air supply line 16 substantially have a peripheral component and are oriented toward one another in an upper and a lower region of the second air supply line 16. The flowpaths of the second air supply line 16 meeting one another in this manner are additionally mixed at the same point with the air passing from the outlets 20 of the first air supply line 14.

Figure 6:
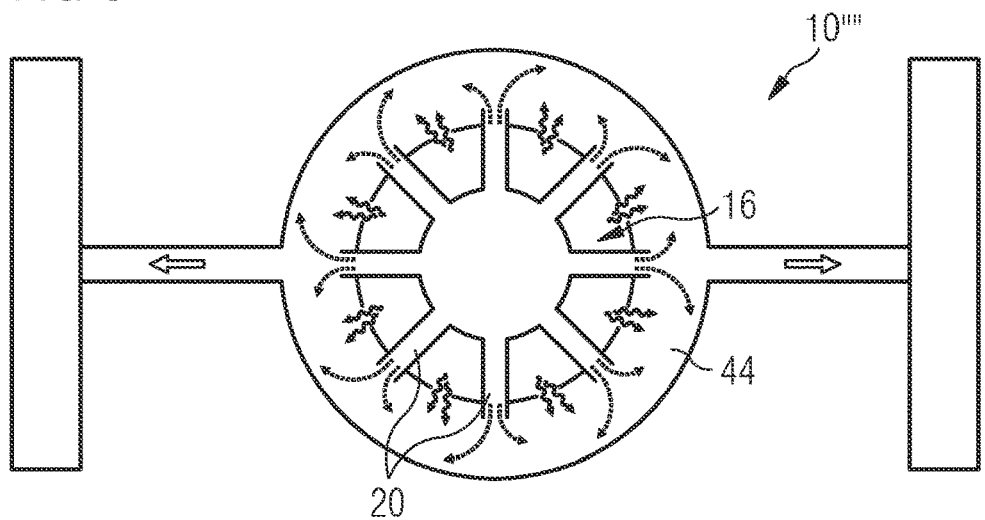
FIG. 6 shows a cross section through a system according to the invention for mixing and distributing air according to a fifth embodiment.

FIG. 6 also shows a further system 10'''' for mixing and distributing air in an aircraft cabin 12, in which in contrast to the above-described embodiments eight outlets 20 are provided, the outlets being arranged so as to be uniformly distributed in the peripheral direction. These outlets 20 are in each case configured as elongated flow lines which in the radial direction lead through the second air supply line 16 and discharge into the mixing region 44. In this manner, a uniform mixing of the supplied air is achieved.

Figure 7:
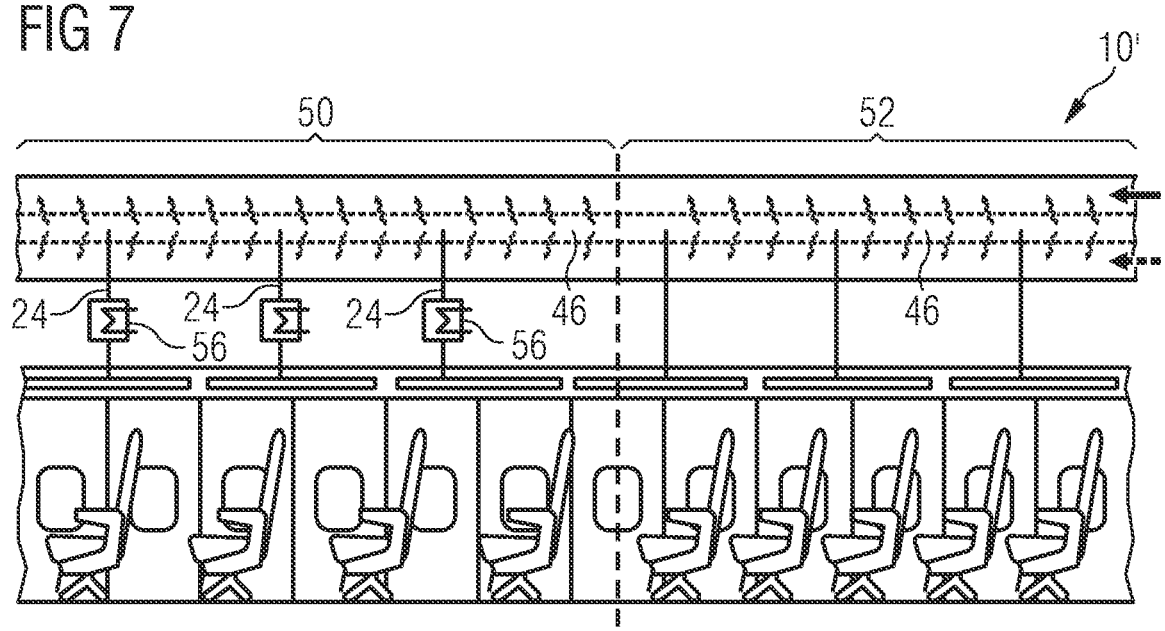
FIG. 7 shows a longitudinal section through the system according to FIGS. 3a and 3b which extends through a region of the aircraft cabin with variable seating density, wherein local heating devices are provided in a first region.

FIG. 7 shows a longitudinal section through the system 10' according to FIGS. 3a and 3b. The perforation density in a first longitudinal portion 50 of the line wall 46 differs from the perforation density in a second longitudinal portion 52 of the line wall 46. In this manner, a first mixing grade in a first region (front seating region of business class seating) and a second mixing grade in a second region (economy class seating) may be possible.

By way of example for all of the above-described embodiments, it is shown further in FIG. 7 that the front three outlet lines 24 (and/or outlet line pairs) are respectively assigned a heating device 56, mixed air being heatable thereby before its introduction into the aircraft cabin 12. As a result, the air blown into the aircraft cabin 12 via the outlet line 24 may be locally heated.

Figure 8:
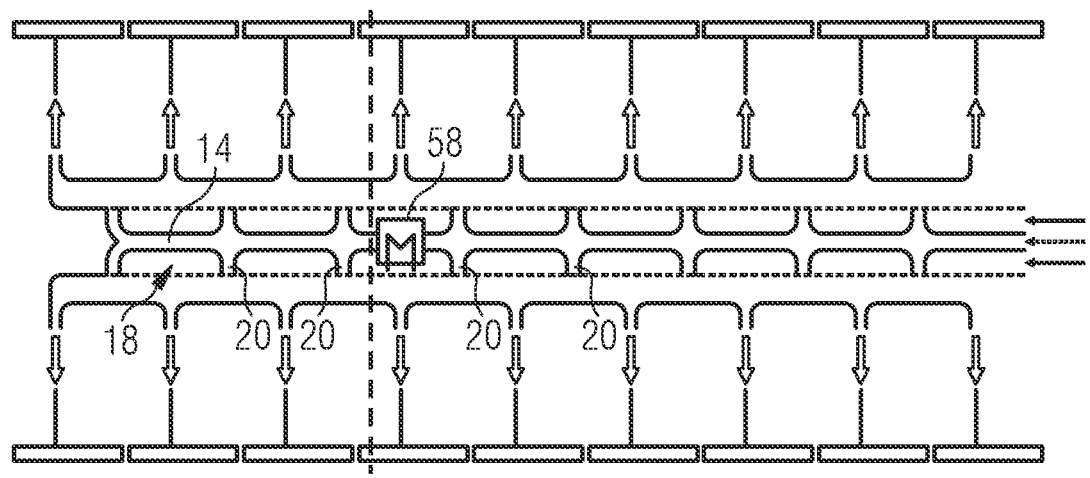
FIG. 8 shows a longitudinal section through a system for mixing and distributing air with an additional central heating device.

In FIG. 8 a variant of the above-described embodiments is shown. In this variant, the first air supply line 14 is assigned a heating device 58, air supplied therein being heatable thereby before its introduction into the mixed air distribution system 18. As a result, the supplied pack air may be partially heated before this air is let into the mixed air distribution system 18 via the outlets 20. In this manner, it is possible to influence partially the temperature, in order to control the temperature of larger regions of the aircraft cabin 12 in a targeted manner.

Figure 9:
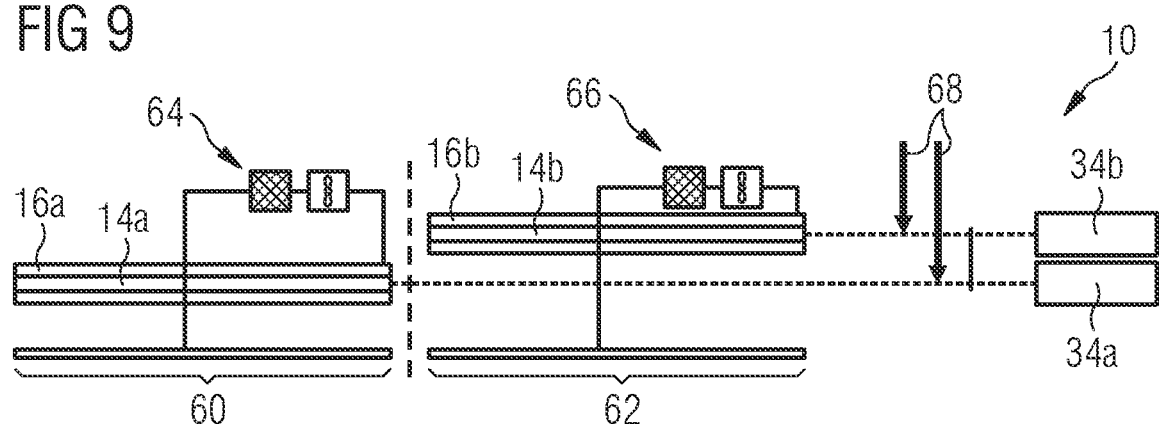
FIG. 9 shows a longitudinal section through a system according to the invention for mixing and distributing air with two temperature zones and first means for controlling the pack air temperature.

FIG. 9 shows a longitudinal section through a further system 10 for mixing and distributing air, wherein this system comprises a first front system region 60 and a second rear system region 62. The first and second system regions 60, 62 in each case may have all of the features shown in the above-described embodiments. For the sake of clarity, only the supply lines 14a, 14b, 16a, 16b are shown. In contrast to the above-described embodiments, however, in each case the first and second system region 60, 62 are assigned a recirculation system 64, 66 which in each case feeds the second air supply lines 16 of the system regions 60, 62. Similarly, in contrast thereto, in each case the first and second system regions 60, 62 are assigned an aircraft air-conditioning unit 34a, 34b (a pack) which in each case feeds the first air supply lines 14a, 14b of the system regions 60, 62. In order to be able to control the supplied pack temperature as desired, two trim air feeds 68 are provided, the trim air feeds being able to influence the air provided by the two aircraft air-conditioning units 34a, 34b (the packs) by feeding the warmer trim air. The trim air feeds 68 are first means for controlling the supplied pack air temperatures. In this manner, two temperature zones may be produced in the aircraft cabin 12.

Figure 10:
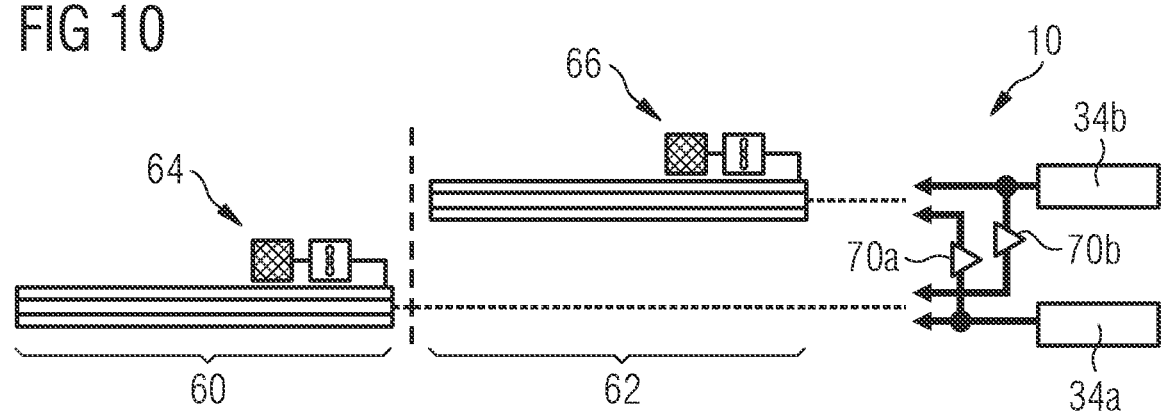
FIG. 10 shows a longitudinal section through a system according to the invention for mixing and distributing air with two temperature zones and second means for controlling the pack air temperature.

FIG. 10 shows a further longitudinal section through a further system 10 for mixing and distributing air, wherein this system 10, in principle, has a similar construction to the system 10 of FIG. 9. In contrast thereto, however, the control of the supplied pack air temperatures in the first and second system region 60, 62 is achieved by the aircraft air-conditioning units 34a, 34b and/or packs in each case providing air at different low temperatures, which are correspondingly mixed together before being conducted further into the two system regions 60 62. In this case, first and second flow valves 70, 72 are used. The flow valves 70a, 70b are second means for controlling the supplied pack air temperatures. In this manner, two temperature zones may also be produced in the aircraft cabin 12.

Figure 11:
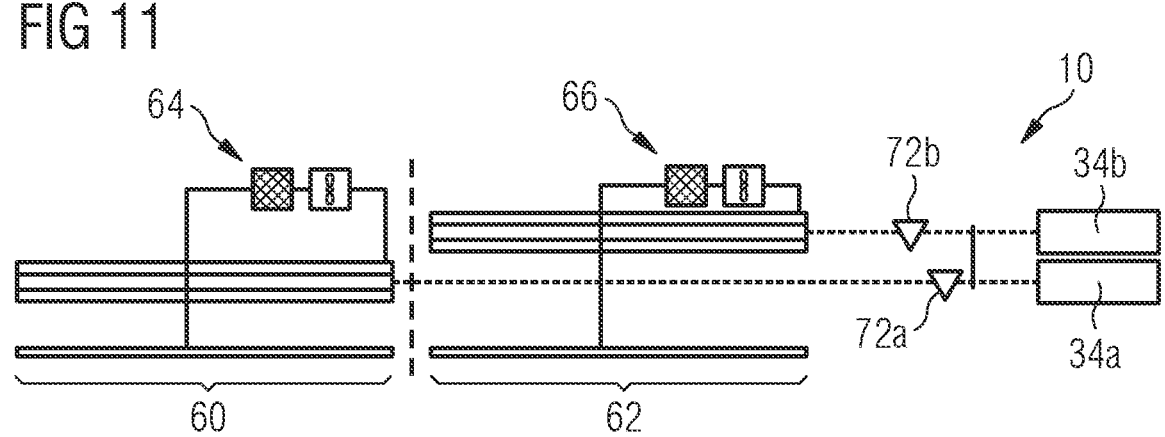
FIG. 11 shows a longitudinal section through a system according to the invention for mixing and distributing air with two temperature zones and third means for controlling the pack air temperature.

FIG. 11 shows a further longitudinal section through a further system 10 for mixing and distributing air. In this variant, however, the control of the supplied pack air temperatures in the first and the second system region 60, 62 is achieved by the flow rate between two aircraft air-conditioning units 34a, 34b and/or packs being varied. In this case, first and second flow valves 72a, 72b are also used. The flow valves 72a, 72b are third means for controlling the supplied pack air temperatures.

Figure 12:
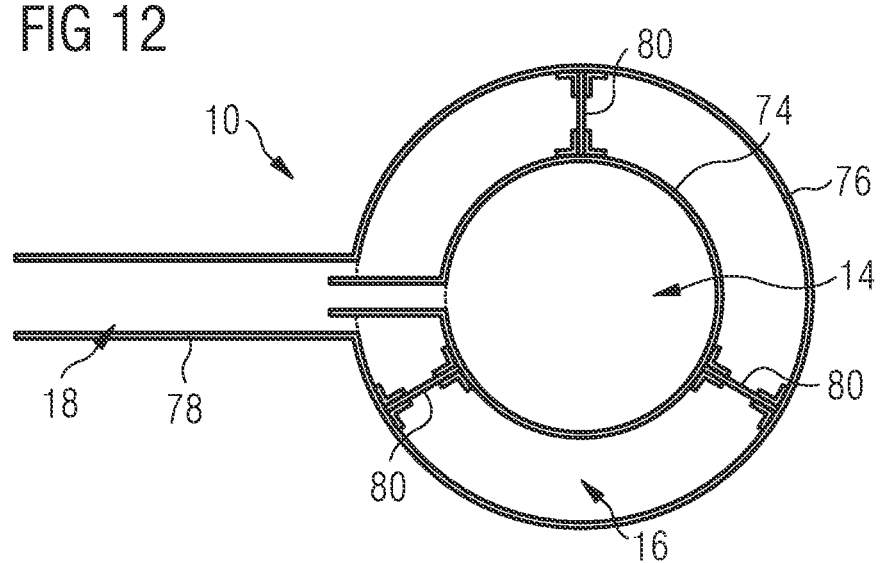
FIG. 12 shows a cross section through a system according to the invention for mixing and distributing air, the line walls thereof at least partially comprising flexible woven fabric.

In FIG. 12 a variant of the system 10 is shown in which the line walls 74, 76, 78 of the first air supply line 14 and/or the second air supply line 16 and/or the mixed air distribution system 18 are at least partially formed from a flexible material, in particular a flexible woven fabric material. In this case, the support structure 80 is provided, the support structure positioning the flexible line walls 74 of the first air supply line 14 and/or the flexible line walls 76 of the second air supply line 16 and/or the flexible line walls 78 of the mixed air distribution system 18 relative to one another.

Figure 13:
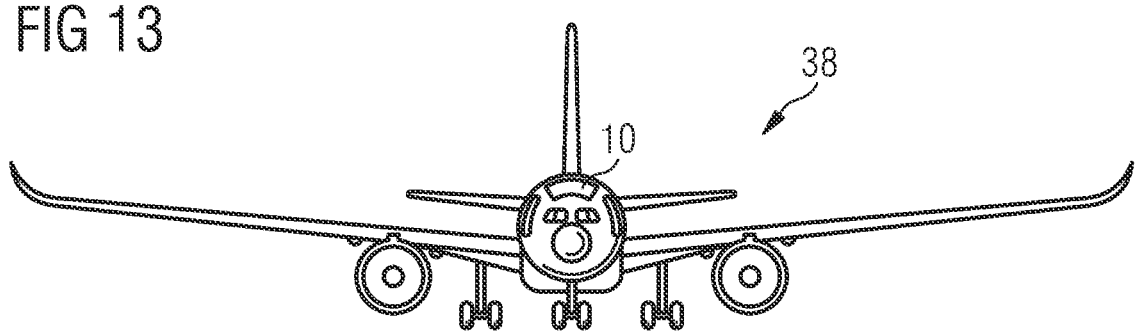
FIG. 13 shows an aircraft according to the invention with a system according to the invention.

FIG. 13 finally shows the aircraft 38 with a system 10 as described above, wherein the system 10 is arranged in the ceiling region of the aircraft tail cross section.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for mixing and distributing air in an aircraft cabin, comprising:
   a supply line within a supply line construction, comprising:

a first internal air supply line having an elongated form extending in a longitudinal direction with opposing ends wherein one opposing end of the first internal air supply line is connected to a first source of a fluid flow, and a second air supply line at least partially surrounding the first internal air supply line having an elongated form extending in the longitudinal direction with opposing ends wherein a first opposing end of the second air supply line is connected to a second source of a fluid flow, wherein the first opposing end of the first internal air supply line and the first opposing end of the second air supply line are located at a common end of the supply line within a supply line construction, and a mixed air distribution system for mixing the air supplied from the first internal air supply line and the second air supply line and for distributing the mixed air, the mixed air distribution system comprising a plurality of outlet lines for the outlet of mixed air into the aircraft cabin, the first internal air supply line and the second air supply line each comprising a plurality of outlets spaced longitudinally along the length of the system which in each case discharge into the mixed air distribution system, and the first internal air supply line and the second air supply line being thermally coupled.

2. The system according to claim 1, wherein for the thermal coupling of the first internal air supply line and the second air supply line, at least one line wall portion of the first internal air supply line forms a line wall portion of the second air supply line.

3. The system according to claim 1, wherein the mixed air distribution system at least partially surrounds the first internal air supply line and the second air supply line.

4. The system according to claim 3, wherein the mixed air distribution system comprises a mixing region fully surrounding the two air supply lines.

5. The system according to claim 2, wherein the outlets of the second air supply line discharging into the mixed air distribution system are formed by a plurality of perforations in a line wall of the second air supply line, wherein the line wall adjoins the mixed air distribution system.

6. The system according to claim 5, wherein the line wall adjoins the mixed air distribution system in a mixing region of the mixed air distribution system.

7. The system according to claim 5, wherein a density of the perforations in a first longitudinal portion of the line wall differs from a perforation density in a second longitudinal portion of the line wall.

8. The system according to claim 1, wherein the outlet lines are arranged at regular intervals in the main direction of extent of the mixed air distribution system.

9. The system according to claim 1, wherein a main outflow direction of at least one of the outlets or the outlet lines is oriented radially relative to a central longitudinal axis of the first internal air supply line.

10. The system according to claim 1, wherein for regulating a mixing ratio, a flow cross sections of an outlet of at least one of the first internal air supply line or second air supply line are changeable.

11. The system according to claim 1, wherein at least one of the outlet lines is assigned a heating device, the mixed air being heatable thereby before its introduction into the aircraft cabin.

12. The system according to claim 1, wherein at least one of the air supply lines is assigned a heating device, the air supplied therein being heatable thereby before its introduction into the mixed air distribution system.

13. The system according to claim 1, wherein the line walls of at least one of the first air supply line, the second air supply line, or the mixed air distribution system, are formed at least partially from a flexible material.

14. The system according to claim 13, wherein the flexible material is formed of a flexible woven material.

15. The system according to claim 14, wherein a support structure is provided, said support structure positioning the flexible line walls of at least one of the first internal air supply line, the flexible line walls of the second air supply line, or the flexible line walls of the mixed air distribution system relative to one another.

16. The system according to claim 1, wherein the first internal air supply line is connected at one end with flow guidance to an aircraft air-conditioning unit and wherein the second air supply line is connected at one end with flow guidance to a recirculated air unit.

17. An aircraft having a system according to claim 1, wherein the system is arranged in a ceiling region of a tail cross section of the aircraft.

18. The system according to claim 1, wherein the air supply lines and the mixed air distribution system have a main direction of extent being oriented substantially parallel or collinear to one another.

* * * * *